United States Patent [19]

Stone et al.

[11] Patent Number: 5,180,782
[45] Date of Patent: Jan. 19, 1993

[54] COMPATIBLE POLYAMIDE-ACRYLIC COMPOSITIONS

[75] Inventors: Edward Stone, Morris Plains; Basil Wasyliw, Newark, both of N.J.

[73] Assignee: BASF Corporation, Parsippany, N.J.

[21] Appl. No.: 657,039

[22] Filed: Feb. 19, 1991

[51] Int. Cl.$^5$ .......................... C08F 8/30; C08L 31/00
[52] U.S. Cl. .................................... 525/183; 525/931; 252/62.2
[58] Field of Search ................... 525/183, 931, 54, 49; 252/62.2

[56] References Cited

U.S. PATENT DOCUMENTS

| | | | |
|---|---|---|---|
| 3,546,142 | 12/1970 | Michaels et al. | 525/183 |
| 4,183,834 | 1/1980 | Evans et al. | 521/150 |
| 4,427,828 | 1/1984 | Hergenrother et al. | 525/183 |
| 4,602,058 | 7/1986 | Graham et al. | 525/183 |
| 4,740,552 | 4/1988 | Grant et al. | 525/66 |

*Primary Examiner*—Nathan M. Nutter
*Attorney, Agent, or Firm*—Michael R. Chipaloski

[57] ABSTRACT

Novel water-soluble compositions are described. In particular, water soluble polyamide-acrylic, polyamide-styrene acrylic and polyamide-styrene maleic resins are disclosed as well as novel methods for their production.

4 Claims, No Drawings

COMPATIBLE POLYAMIDE-ACRYLIC COMPOSITIONS

FIELD OF INVENTION

The present invention relates to novel compositions and methods of producing water soluble resins and particularly of producing water-soluble polyamide-acrylic, polyamide-styrene-acrylic or polyamide-styrene-maleic resins. Such resins are especially useful as vehicles in aqueous inks and coatings and as pigment dispersants.

DESCRIPTION OF PRIOR ART

The modification of synthetic high-molecular weight polyamide products such as fibers, films and fabrics composed of nylon as well as natural polyamide products such as wool, silk, leather, by means of graft polymerization treatment primarily with acrylic and methacrylic acids was described in U.S. Pat. Nos. 3,297,471, 4,369,036, and 3,188,228. The objective of the treatment was to impart to these crystalline insoluble products desirable properties such as hygroscopicity, antistatic property and soil resistance while maintaining the useful characteristics of the parent polyamides.

Published European Patent Application, No. 0194889 describes a free-radical solution polymerization technique of grafting water insoluble polyamide resins with acrylic copolymers which contain acrylic or methacrylic acid components. As a result, the polyamides acquired carboxylic functionality that rendered them waterborne.

The products obtained by a free-radical solution polymerization method normally suffer from the presence of residual monomers as well as the presence of the organic peroxide decomposition fragments which impart undesirable odors and toxicity. This constitutes a major shortcoming of this approach.

U.S. Pat. No. 4,690,712 to Janusz relates to the preparation of publication gravure inks by the neutralization of an amine-reactive polyamide with a metal resinate. The products are made in toluene or mixtures of aromatic and aliphatic solvents and are reported to exhibit improved holdout (non-penetration) on porous paper stock. This reference pertains only to solvent based systems which employ metal resinates as one of the ingredients (reactants).

In related copending patent application Ser. No. 241,533 filed Sep. 7, 1988, now abandoned, commercial polyamides are modified with carboxyl containing materials, such as maleated, fumarated, itaconated and acrylated rosins; polyvinyl maleic acid copolymers, such as styrene-maleic resins and polybasic acids, such as citric, tartaric, etc. These carboxylated polyamide products were manufactured by fusion of the components over extended periods of time at temperatures of 180°-250° C. The new resins had different physical and chemical properties from their original components, although retaining some of the desirable characteristics of parent polyamides, such as flexibility, high gloss, and adhesion to a variety of surfaces, especially plastic films.

In copending patent application Ser. No. 247,201, filed Sep. 21, 1988, carboxylated polyamide products are obtained by fusion of polyamides with carboxylated rosins and styrene-acrylic polyelectrolytes for extended periods of time at temperatures 180°-250° C. The products of these earlier patent applications contained no toxic volatiles or residual monomers and could be dissolved in organic solvents for applications as non-aqueous coatings and ink vehicles. In addition they could be rendered waterborne by neutralization with alkali or amines.

SUMMARY OF THE INVENTION

We have now found a process that merely involves heating an aqueous solution of carboxylated polyamide with an aqueous solution of styrene-acrylic, styrene-maleic or all-acrylic resin until the two resins are compatible.

The process is not limited to the use of carboxylated polyamides. Polyamides containing free primary amine functionality can also be rendered water soluble by this technique.

Thus, this invention utilizes a process of extreme simplicity: merely mixing the initially incompatible ingredients in ammoniated water, below the boiling temperature, until they dissolve and become compatible. The mechanism appears to be one of neutralization of a basic resin with an acidic resin. This is an unexpected result, because, generally, when an acidic resin is neutralized by a basic resin, the result is usually an insoluble product.

The present invention utilizes as starting materials high molecular weight polyamide resins or hot melt adhesive polyamides that were previously carboxylated by the method described in the earlier patent applications and subsequently dissolved in ammoniated water. It also utilizes high amine number multifunctional polyamides that are normally used as epoxy crosslinkers. By the method of this invention, these polyamide resins are made compatible with all-acrylic, styrene-acrylic and styrene-maleic polyelectrolytes, provided the latter are dissolved in ammoniated water before addition of the polyamides is attempted.

It is, therefore, an object of this invention to disclose a process for rendering proprietary or commercially available polyamides water soluble and compatible with all-acrylic, styrene-acrylic and styrene-maleic polyelectrolytes which commonly are used as letdown and pigment dispersant vehicles in waterborne inks and coatings. Yet, another object of this invention is to produce modified polyamides, with high glass transition temperatures to improve their heat and block resistance.

Still another object of this invention is to use polyamides, which are relatively soft solids or viscous semi-liquids, as plasticizers for high softening point, brittle acrylic, styrene-acrylic or styrene-maleic polyelectrolytes to transform them into good, pliable film formers.

DETAILED DESCRIPTION OF INVENTION

The invention relates to polyamides modified with acrylic, styrene-acrylic, styrene-maleic or other typed of polyelectrolytes for the use in waterborne printing inks and coatings as letdown and pigment dispersant resins.

One class of polyamides useful in this invention is high molecular weight thermoplastic resins of low acid and amine functionality based on fatty acids (monofunctional, dimer and trimer acids) and amines (monoamines, diamines and multi-functional amines). For use in this invention, the polyamides of this class must be carboxylated according to the method of the prior art reference. Specifically, they must be reacted with fumarated, maleated or itaconated rosins in a typical Diels-Alder type reaction to acquire sufficiently high acidity to become soluble or dispersible in ammoniated water. To be useful, the acid number must be 65 or higher and preferably 80-150.

The carboxylated polyamides, described above, are generally considered to be incompatible with styrene-acrylic polyelectrolytes, which are employed in the ink industry as letdown and pigment dispersant vehicles. According to the method of this invention, the carboxylated polyamides are rendered compatible when their aqueous solutions or dispersions are blended with ammoniated water solutions of acrylic or styrene-acrylic polyelectrolytes. This method is illustrated in Examples 4-6. The proof of this compatibility are dry films, which are clear and glossy.

Another class of polyamides useful in this invention are reactive polyamides with primary amine numbers of 80 or higher, which are highly viscous, sticky, syrupy liquids used primarily as epoxy crosslinkers. Their molecular weights are low, ranging from a few hundred to a few thousand. These polyamides are considered to be water insoluble and incompatible with styrene-acrylic and styrene-maleic resins. However, when introduced under mild heating and agitation into aqueous amine or ammonia solutions of acrylic, styrene-acrylic or styrene-maleic polyelectrolytes, these polyamides become compatible with these resins. The very nature of these reactive polyamides (stringy, sticky and highly viscous liquids) makes them good plasticizers for high Tg, brittle styrene-acrylic and styrene-maleic polyelectrolytes. Thus, the resulting products usually form glossy, pliable and strong films.

The polyamide resins are valued in coating and ink industry for their excellent film-forming properties and adhesion to a variety of plastic films. These are the properties which make them desirable for use in waterborne inks and coatings. This invention makes this objective possible.

Typical polyelectrolyte resins of this invention are acrylic, styrene-maleic, styrene-acrylic, ethylene-acrylic, or alpha olefin-maleic copolymers, terpolymers or interpolymers. They must be readily soluble in water when neutralized with a base, and have sufficiently high acid numbers to neutralize the polyamides to render them water-borne. To be useful, these polyelectrolytes must have acid numbers in the range of 80-350, or preferably between 180-250. They are extensively used in waterborne inks to improve resolubility on the press and as aqueous pigment dispersants.

Generally, commercial styrene-acrylic resins of this class have high gloss transition temperatures and are, therefore, brittle and poor film-formers. Styrene-maleic resins have similar shortcomings. Alone, these polyelectrolytes have the added disadvantage of being very water sensitive because of their high acidity and poor film integrity.

We find it advantageous to use in this invention, in addition to the commercially available styrene-acrylic and styrene-maleic polyelectrolytes, proprietary styrene-acrylic and all acrylic resins. They also must be water soluble when neutralized with ammonia or amines. The advantage of proprietary resins is that they can be tailor-made to meet a variety of film-forming, adhesion, water solubility, hardness and other requirements. They are usually synthesized in organic solvents by a free-radical solution polymerization technique. Alcohols and ketones are preferred solvents, but toluene and xylene can also be used. The resins are made waterborne by removing the organic solvent completely or partially by evaporation or azeotropic distillation and replacing it with an aqueous solution of ammonia or amine.

A variety of monomers can be used in the synthesis of styrene-acrylic or acrylic polyelectrolyte resins. The unsaturated carboxylic acid components are essential in any monomer combination, since the resins must become water soluble after neutralization. The preferred acidic monomers are acrylic and methacrylic acids. Of the other vinyl or acrylic monomers which can be used, those preferred are styrene and acrylic and methacrylic esters. The derivatives of styrene such as p-methyl styrene, alpha-methyl styrene and vinyl toluene can also be utilized. The choice of components and the composition ratio depend on the properties desired. The properties that are of greatest interest in this invention are glass transition temperature and surface tension.

In the earlier patent applications referred to above, it was shown that the problems of incompatability of polyamides with acrylic or styrene-acrylic resins and their water insolubility were overcome by reacting the polyamide ink resins and hot melt polyamide adhesives at high temperatures (180°-250°) and for prolonged periods (1-4 hours) with a combination of carboxylated rosins and styrene-acrylic polyelectrolytes. As a result of this fusion reaction, new resins were synthesized which were higher and preferably in 80-150 range. These new resins produced clear and glossy films on drying their aqueous ammonia solutions.

In related copending application entitled Waterborne Polyamide Acrylic Resins the compatibility of polyamides with acrylic or styrene-acrylic resin polyelectrolytes can be achieved by simpler methods. This was done merely by melting and mixing these ingredients in bulk to uniformity, or by dissolving a polyamide in an organic solvent solution or styrene-acrylic or all acrylic resin. In the present invention we achieve the compatibility and water solubility of polyamides by dissolving them directly in ammoniated water or amine-containing water solutions of styrene-acrylic or acrylic polyelectrolyte resins. As illustrated in Examples 1-3, the reactive polyamides, described earlier, can be thus incorporated into these solutions directly, without requiring any previous modifications.

The vehicles of this invention can be applied to a variety of substrates, such as plastic, metallic foil, paperboard and the like. The substrates of greatest interest are plastic films, particularly those that are difficult to print.

The vehicles of this invention can be used in aqueous inks and coatings. They can be applied as overprint varnishes and clear lacquers. The usual methods of application for inks could be used, such as flexo and gravure printing.

The products of this invention can, generally, be regarded as good pigment dispersants, since they are composed of polyamide resins and styrene-acrylic, styrene-maleic or acrylic polyelectrolyte resins which are individually used as pigment dispersants. Dry grinding of pigments in aqueous solutions of products of this invention is one suitable method for pigment dispersion.

The inks and coating compositions of this invention can contain pigments in the amount of 0.1-30 percent. A variety of pigments normally used in aqueous ink and coating systems can be employed.

This invention has several advantages over the prior art. The process is simple and more energy efficient. In addition, it is not limited to solid resin ingredients. In particular, acrylics in ammonia (amine) solution can be employed. The process does not generate toxic by-products or impurities. These advantages reduce costs and produce environmental safe products.

The following examples in which formulation ingredients are given in parts by weight further illustrate this invention.

EXAMPLE 1

| | Parts by Weight | Ingredients |
|---|---|---|
| A | 90.91 | Joncryl 584* |
| B | 9.09 | Versamid 115** |
| | 100.00 | |

*Joncryl 584 is a 30% solution of Joncryl 678, an acrylic resin of acid number of 200, in ammoniated water. It is a product of S. C. Johnson and Son, Inc.
**Versamid 115 is a polyamide resin of amine number of 230. It is a product of Henkel Corporation.

PROCEDURE

A jar was charged with ingredients A and B. The contents were agitated by a magnetic stirrer and heated on a hot plate to about 60° C. The batch was processed until it became one-phase, uniform and clear.

The film of this vehicle was clear and hard, but somewhat brittle.

EXAMPLE 2

| | Parts by Weight | Ingredients |
|---|---|---|
| A | 83.33 | Styrene copolymer of example 6 |
| B | 4.18 | Versamid 115** |
| C | 12.49 | Deionized water |
| | 100.00 | |

**Versamid 115 is a polyamide resin of amine number of 230. It is a product of Henkel Corporation.

PROCEDURE

A jar was charged with ingredients A, B and C. The contents were agitated by a magnetic stirrer and heated on the hot plate to about 80° C. The batch was processed until it became uniform (one phase) and clear. The film of this vehicle was clear and hard.

EXAMPLE 3

| | Parts by Weight | Ingredients |
|---|---|---|
| A | 20.83 | SMA-1000* |
| B | 12.50 | Ammonia (conc.) |
| C | 50.00 | Deionized water |
| D | 12.50 | Deionized water |
| E | 4.17 | Versamid 115** |
| | 100.00 | |

*SMA-1000 is a styrene-maleic resin manufactured by Atochem, Inc.
**Versamid 115 is a polyamide resin of amine number of 230. It is a product of Henkel Corporation.

PROCEDURE

A reactor was charged with C an d the content was heated to 80° C. Item A was then added, followed by gradual addition of B. The batch was processed at 80° C. until all resin A dissolved. The items D an E were added and the batch was processed until all E was incorporated and the batch became clear and uniform. The film of this vehicle was clear and somewhat brittle.

EXAMPLE 4

| | Parts by Weight | Ingredients |
|---|---|---|
| A | 4.88 | WW gum rosin |
| B | 1.15 | Maleic anhydride |
| C | 8.99 | Macromelt 6238* |
| D | 2.48 | Ammonia (conc.) |
| E | 25.39 | Deionized water |
| F | 50.00 | Joncryl 584** |
| G | 7.11 | Deionized water |
| | 100.00 | |

*Macromelt 6238 is a hot melt polyamide adhesive manufactured by Henkel Corporation.
**Joncryl 584 is a 30% solution of Joncryl 678, an acrylic resin of acid number of 200, in ammoniated water. It is a product of S. C. Johnson and Son, Inc.

PROCEDURE

A reactor was charged with A. the content was melted under a nitrogen blanket. The item B was added gradually to avoid excessive foaming. Then, the batch was heated to 200° C. and processed for 2 hours. The item C was charged, with caution, to permit uninterrupted agitation. The batch was heated to 230° C. and processed at that temperature for one hour. With the heat and nitrogen turned off, and cooling water on the condenser turned on, the solution of D a nd E was added, with caution at first, to prevent excessive foaming, then more rapidly, as the temperature dropped below 100° C. The batch was characterized to determine pH and TNV.

The items F and G were charged and the batch was processed at 60° until a uniform, clear solution resulted. The batch was cast and characterized.

The vehicle formed a clear, glossy film. The solution had a low viscosity and molecular weight in comparison to the vehicle of Comparative Example 5.

COMPARATIVE EXAMPLE 5

| | Parts by Weight | Ingredients |
|---|---|---|
| A | 4.86 | WW gum rosin |
| B | 1.14 | Maleic anhydride |
| C | 9.00 | Macromelt 6238* |
| D | 15.00 | Morez 100** |
| E | 5.36 | Ammonia (conc.) |
| F | 64.64 | Deionized water |
| | 100.00 | |

*Macromelt 6238 is a hot melt polyamide adhesive manufactured by Henkel Corporation.
**Morez 100 is an acrylic resin, with acid number of 200. It is a product of Morton Thiokol, Inc.

PROCEDURE

A reactor was charged with A. The content was melted under nitrogen blanket. The item B was added gradually to avoid excessive foaming. Then, the batch was heated to 200° and processed for two hours. The item C was charged with caution to permit uninterrupted agitation. The batch was heated to 230° C. and processed at that temperature for one hour. The item D was then added with caution to permit uninterrupted agitation. The temperature was stabilized at 230° C. and the batch was processed for one hour. The batch was then cast and allowed to solidify. The chunks of solid resin were charged into reactor. A solution E and F was added and the contents were heated to 80° C. and vigorously agitated. The batch was processed until all of the resin was dissolved. The vehicle was cast and characterized.

The film of this vehicle was glossy and clear. The solution was more viscous and MW was higher that of the vehicle of Comparative Example 4.

COMPARATIVE EXAMPLE 6

PART 1

|   | Parts by Weight | Ingredients |
|---|---|---|
| A | 12.73 | Methylisobutyl ketone |
| B | 1.60 | Acrylic acid, glacial |
| C | 2.31 | Styrene |
| D | 6.14 | Acrylic acid, glacial |
| E | 9.23 | Styrene |
| F | 4.96 | Methylisobutyl Ketone |
| G | 0.63 | t-Butyl peroctoate |
| H | 1.62 | Methylisobutyl ketone |
| I | .04 | t-Butyl peroctoate |
| J | 34.97 | Deionized water |
| K | 6.38 | Ammonia (conc.) |
| L | 0.65 | Tributylphosphate |
| M | 17.44 | Deionized water |
| N | 1.00 | Ammonia (conc.) |
|   | 100.00 |   |

PROCEDURE

A reactor was charged with A, B and C. The contents were agitated and heated to reflux. Began a two-hour simultaneous addition at a steady rate of a monomer solution of D and E and a catalyst solution of F and G. Added H and I solution fifteen minutes after completion of monomer and catalyst solutions feeding. The batch was processed at reflux for additional hour.

The batch was cooled to 85° C., then J was added. This was followed by the addition of K. Subsequently, L was charged. Heat was reapplied and methylisobutyl ketone was removed by azeotropic distillation. Solids and pH were adjusted with items M and N (solids=29.0%, pH=8.0). The batch was cast and characterized.

COMPARATIVE EXAMPLE 6

PART 2

|   | Parts by Weight | Ingredients |
|---|---|---|
| A | 11.36 | WW gum rosin |
| B | 2.67 | Maleic anhydride |
| C | 20.98 | Macromelt 6238* |
| D | 5.79 | Ammonia (conc.) |
| E | 59.20 | Deionized water |
|   | 100.00 |   |

*Macromelt 6238 is a hot melt polyamide adhesive manufactured by Henkel Corporation.

PROCEDURE

A reactor was charged with A. The content was melted under nitrogen blanket. The item B was added gradually to avoid excessive foaming. Then the batch was heated to 200° C. and processed for 2 hours. The item C was charged, with caution, to permit uninterrupted agitation. The batch was heated to 230° C. and processed at that temperature for one hour. With the heat and nitrogen turned off, and cooling water on the condenser turned on, the solution of D and E was added, with caution at first, to prevent excessive foaming, then more rapidly, as the temperature dropped below 100° C. The batch was characterized to determine pH and TNV (pH=9.5, TNV=34%).

COMPARATIVE EXAMPLE 6

PART 3

|   | Parts by Weight | Ingredients |
|---|---|---|
| A | 54.70 | Vehicle of Part 1, Example 6 |
| B | 45.30 | Vehicle of Part 2, Example 6 |
|   | 100.00 |   |

PROCEDURE

A jar was charged with items A and B. The contents were agitated by a magnetic stirrer and heated on a hot plate to about 60°-70° C. The batch was processed for several hours, but never became clear, one-phase solution, as one in Example 4.

This example illustrates that a high acid resin of Part 1, Example 6 cannot be neutralized sufficiently, at a given ratio, with carboxylated polymide of Part 2, Example 6 to become fully compatible with it. The same resin will be neutralized with a reactive polyamide (Versamid 115) and become compatible with it, as in Example 2.

We claim:

1. A product of the reaction of a water insoluble polyamide having an amine number greater than 80 mg KOH/g polymer and a melting point less than 110° C., with an aqueous solution of a carboxylic polyelectrolyte wherein the polyelectrolyte is selected from the group consisting of acrylic, methacrylic, maleic and itaconic acid containing polymers, with an acid number of 65-500 mgKOH/g polymer and a weight average molecular weight of 1,500-65,000.

2. A product of claim 1 in which the weigh fraction of polyamide to carboxylic resin polyelectrolyte can vary from 0.10 to about 0.30.

3. The process of claim 1 wherein the polyamide is compatibilized and neutralized by addition to an aqueous solution of the polyelectrolyte under agitation at a temperature of about 60° C. to about 80° C.

4. An aqueous solution of the product of the process of claim 1 wherein the neutralizing agent for the polyelectrolyte is selected from ammonia and amines.

* * * * *